United States Patent Office 2,940,899
Patented June 14, 1960

2,940,899

ANTI-TUBERCULAR AGENTS

Peter P. T. Sah, Davis, Calif., assignor to The Regents of the University of California, Berkeley, Calif.

No Drawing. Filed Sept. 28, 1953, Ser. No. 382,838

6 Claims. (Cl. 167—65)

This invention relates to new chemical compositions that not only possess a high degree of bactericidal effectiveness against micro-organisms, but which are further characterized by a remarkably low degree of toxicity. More particularly, this invention relates to a means and to chemical compositions useful for combating, preventing the spread, and, under proper conditions, eliminating tuberculosis in human beings and other animals.

For years men of science and medicine have sought a means to combat the contagious disease caused by the tubercle bacillus (*Mycobacterium tuberculosis*). The disease is exceedingly widespread, and it has been estimated that tuberculosis causes about one-eighth of all deaths. The seriousness of the disease in humans depends on the organ involved, the virulence of the strain of tubercle bacilli and the resistance of the individual infected. Almost any portion of the body may be involved in the tubercular process, although the commonest site is the lungs. As a result, the commonest method of transmitting the human strain is through droplet infection sprayed into the air by coughing or the drying of tubercular sputum which is spread around as dust. The bacilli may live in the dry sputum for years, and in the dust form they are distributed over wide areas. In cities nearly everyone is constantly breathing in live tubercle bacilli.

Until recently, the treatment of the disease was based almost solely on the recuperative powers of the body aided by proper therapy such as fresh air, diet, bed rest, collapse treatment, and good nursing. Several years of strict regime are necessary for arresting or curing the disease, and relapses are common even after apparent cure.

Recently, significant advances have been made in the treatment of human tuberculosis due to the discovery of certain drugs, such as streptomycin, which act directly to inhibit the growth or multiplication of the bacillus. In this way these drugs help the recuperative powers of the body to dispose of the disease more effectively and in much less time. More recently, isonicotinic acid hydrazide, a known compound, was found to have similar antitubercular properties. This fact is disclosed in United States Patent No. 2,596,069. Other compounds also known to have antitubercular activity are thio-semi-carbazone, and para-amino-salicylic acid. However, each of the above named drugs have, in common, certain significant shortcomings:

(1) They are toxic so that in useful doses the drugs are not always well tolerated;

(2) When the drugs are given in tolerable doses, the drugs have only a bacteriostatic rather than a bactericidal activity towards the tubercle bacilli, that is they merely inhibit the growth of the bacilli rather than destroy it;

(3) The drugs have had little or no effect on advanced fibrotic type cases, particularly those of long duration, and have been more or less limited in their use to a fresh exudative type of the disease; and (4) The bacilli may learn to live with the drug so that new or resistant strains are developed which are not affected by the drug at all. These resistant strains of bacilli may spread to other patients who, as a result, will be unable to respond to even initial treatment with the drug. This problem particularly characterized the development of streptomycin therapy, and now is a factor in the evaluation of any new chemotherapeutic agent.

Beside these shortcomings, each of the drugs creates additional problems of its own in use. For example, streptomycin may only be given by injection, and has been known to cause temporary or permanent deafness, vertigo, and dizziness. Para-amino-salicylic acid may cause prolonged diarrhea, or other serious side effects, and is, at best, only a weak anti-tubercular agent. Combinations of certain drugs, such as streptomycin and para-amino-salicylic acid, have been used to delay the appearance of resistant strains of bacilli, but never with permanent success.

In particular, study of isonicotinic acid hydrazide has indicated a high degree of toxicity in humans undoubtedly due partially to the presence of the free hydrazino group. For example, it has been reported that isonicotinic acid hydrazide, given in large doses, may produce the following side effects: blood dyscrasia, anemia, constipation, and difficulty of urination. Consequently, the maximum safe dosage of this drug for human use has been 250 to 300 mg. per day or less. Such doses are not bactericidal, but are only sufficient to inhibit the growth of the bacilli. There may also be a marked stimulation of the central nervous system, evidenced by convulsions or respiratory trouble, which is therapeutically undesirable, particularly in the treatment of tuberculosis where complete rest and quiet are need. (J. Amer. College of Chest Phys., vol. XXXIII, No. 1, 1953, Robitzek et al., pp. 8–10, Witkind et al., pp. 21–25; Dela State Med. J., August 1952, Flaherty, pp. 198, 199.) In addition, strains of tubercle bacilli resistant to isonicotinic acid hydrazide rapidly develop. Likewise, the existence of resistant strains of bacilli not previously responsive to the drug have also been reported. (Antibiotics and Chemotherapy, vol. 2, No. 9, pp. 484–486.)

The present invention is directed to new chemical compositions which have a high degree of bactericidal activity against micro-organisms yet which are comparatively much less toxic than compounds presently used in treating diseases caused by such microorganisms. Consequently, one object of the present invention is to produce new isonicotinyl hydrazines from the d-uronic acids, their salts, and their lactones which are not only bactericidal in their activity but which also are sufficiently non-toxic to permit their full use in utilizing this bactericidal activity against *Mycobacterium tuberculosis*.

Another object of the present invention is to produce new isonicotinyl hydrazones which act as chemical moieties to achieve higher blood concentrations of an antitubercular agent than is possible with the free isonicotinic acid hydrazide.

Another object is to produce new compounds for combating human tuberculosis that are so much less toxic than other known active compounds for this purpose as to permit their administration in bactericidal dosages.

Another object is to provide new compounds which may be given in sufficiently large doses to make them effective against advanced fibrotic types of tuberculosis.

Another object is to produce such compounds that have no appreciable effect in stimulating the central nervous system when used as a human medicament.

Another object is to produce bactericidal compounds that will act to diminish lung lesions and the volume of sputum resulting from tuberculosis in a human patient, and which will also render such sputum harmless due to the absence of live bacteria.

Another object is to produce an active antitubercular agent that will produce no harmful side effect in the patient or animal to whom it is administered.

Many other objects and advantages of the present invention will appear from the following description.

As has been noted, isonicotinic acid hydrazide is known to be a very active antitubercular agent but cannot be satisfactorily used as such due to its extreme toxicity and its tendency to stimulate the central nervous system. The present invention takes advantage of this activity by condensing the hydrazide with the d-uronic acids and their lactones, which are known detoxicating agents, to produce new isonicotinyl hydrazones having a chemically stable bond between the hydrazide and the carbonyl groups. These new compounds have exhibited excellent antitubercular characteristics when tested in vitro, in vivo, and clinically. Not only have these drugs demonstrated a marked activity against Mycobacterium tuberculosis, but the fact that the drugs have proved to be so much less toxic to humans than is the free hydrazide, the uncombined isonicotinic acid hydrazide, has permitted dosages of the new drugs in sufficient quantities to permit complete destruction of the bacilli in animals as well as in human patients.

Because of prior research, including work on the derivatives of isonicotinic acid hydrazide, these favorable results could not be readily foreseen. In general, one combining a non-polar biologically active substance with a polar, detoxicating substance, such as the uronic acid derivatives, would expect the biological properties to be lost by the combination. Instead, it has been found that the antitubercular activity of the uronic acid derived isonicotinyl hydrazones on an equal weight basis is approximately equal to that of the free isonicotinic acid hydrazide; while the toxicity of these new drugs is approximately 1/10th that of the uncombined hydrazide. As a consequence, the new isonicotinyl hydrazones have been administered to patients in amounts up to 2,500 to 3,000 mg. per day with no untoward effects.

From a clinical standpoint, these drugs have resulted in a noticeable decrease in the size and number of tubercular lesions in patients' lungs, and a corresponding reduction in the volume of sputum produced. Also the sputum that is produced is negative, that is, it no longer contains the tubercle bacilli.

Of equal or even greater significance is the fact that, at high dosage, no strains of tuberculosis bacilli have been able to live with the drug long enough to form drug resistant strains. The probable reason for this is that blood level concentrations correspond to the high drug dosage possible with the new hydrazones, thereby permitting complete elimination of the tubercle bacilli and indicating no drug resistance at these concentrations.

Of even more significance is the fact that comparative tests have shown that bacteria strains resistant to the action of isonicotinic acid hydrazide have been attacked and destroyed by equal concentrations of the new hydrazones, indicating a protective capacity of the new drugs in an area where the free hydrazide is ineffectual. In addition, the hydrazones formed from the d-uronic acids and their lactones have shown no measurable tendency to stimulate the central nervous system, or to cause blood dyscrasias or other side effects in patients tested, a very important therapeutical factor in the treatment of humans. Based on a comparison with the uncombined hydrazide, these facts indicate that the new isonicotinyl hydrazones act as a moiety, and not by hydrolysis to produce the free hydrazide.

Broadly, the new isonicotinyl hydrazones are prepared by dissolving the d-uronic acid derivative in a suitable solvent, such as methyl alcohol, and adding the isonicotinic acid hydrazide. The reactants are then boiled a sufficient time to allow the condensation reaction to occur. The reaction mixture is then cooled to room temperature with the isonicotinyl hydrazones appearing as crystals within a relatively short time, i.e. 24 hours or less. The crystals are filtered from the solution and, preferably, are washed and finally dried by suction.

The following are illustrative examples of the preparation of three representative isonicotinyl hydrazones; using procedures that resulted in very high yields of the crystalline products obtained.

EXAMPLE 1

One of the isonicotinyl hydrazones prepared from a lactone is d-glucuronolactone isonicotinyl hydrazone,

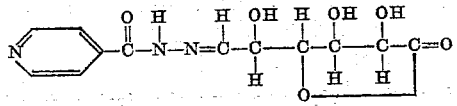

a new compound with comparatively low toxicity and very high anti-tubercular activity. This compound has been prepared as follows:

To 88 grams of d-glucuronolactone, in the bottom of a three liter round bottom flask, was added 1.5 liters of methyl alcohol (acetone-free). The mixture was boiled gently on a steam bath for 10 minutes, producing a clear solution. To this hot solution, 70 grams of isonicotinic acid hydrazide was added all at once. The mixture was then boiled vigorously for 10 minutes and the clear solution filtered without suction through a piece of lens paper into a two liter Erlenmeyer flask. After the flask had been allowed to stand 24 hours at room temperature, crystals in the form of beautiful white rods and narrow plates were observed. These crystals were filtered with suction, washed with a small amount of methyl alcohol, and sucked to complete dryness. The resulting product was dried in a vacuum desiccator for three days. Actual yield was 148 grams, or a percentage yield of better than 99%.

On heating the d-glucuronolactone isonicotinyl hydrazone thus formed, the crystals charred and decomposed with foaming between 150 and 160° C. without any sharp melting point. The particular decomposition point depended on the rate of heating and the type of apparatus used. The new compound was readily soluble in water from which it could not be recrystallized. It was practically insoluble in cold methyl or ethyl alcohol but slightly soluble in boiling solutions of these solvents (100 cc. of methyl alcohol dissolved about 1.2 grams of the product at 66° C.). The new compound was already very pure, and upon recrystallization from a large amount of methyl or ethyl alcohol (absolute) showed no appreciable change in physical properties from the unrecrystallized product.

EXAMPLE 2

D-glucuronolactone isonicotinyl hydrazone has also been prepared from sodium d-glucuronate as follows:

D-glucuronic acid was liberated from a solution of its sodium salt (12.0 g.) in water (25 ml.) by the addition of concentrated hydrochloric acid (5 ml.). To the mixture, sodium acetate (5 g.) was added to remove the excess of the mineral acid. Isonicotinic acid hydrazide (7.0 g.) was then introduced into the clear solution and mixing accomplished by thorough shaking. Methyl alcohol (250 ml.) was added and the mixture boiled on a steam bath for 10 minutes. A white crystalline precipitate started to separate from the solution after a few minutes heating and was allowed to stand overnight at room temperature before filtering. The crystals (white small rods) were sucked to dryness, washed with a small amount of absolute methanol and again sucked to dryness. The product was further dried in a vacuum desiccator for twenty-four hours. Yield: 25–50 percent. The hydrazone melted at 150–160° (uncorr.) with charring and decomposition.

EXAMPLE 3

An isonicotinyl hydrazone prepared from a uronic acid is d-galacturonic acid isonicotinyl hydrazone,

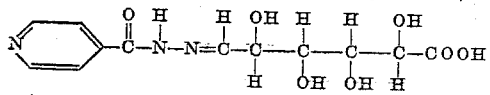

also a new compound that is highly active against *Mycobacterium tuberculosis* and comparatively much less toxic than isonicotinic acid hydrazide. This compound has been prepared as follows:

In an Erlenmeyer flask of one liter capacity, 16.7 grams of isonicotinic acid hydrazide was dissolved in 170 cc. of methyl alcohol (acetone-free) by heating on the steam bath. To the hot solution 25 grams of d-galacturonic acid, dissolved in 150 cc. of hot distilled water, was added. The reactants were thoroughly mixed by shaking and the flask heated on the steam bath for 10 minutes. Crystalline precipitate (white platelets) was seen to form even when the solution was boiling hot. After twenty-four hours of standing at room temperature, the crystalline product was filtered off with suction, washed first with a small amount of ice-cold distilled water, and then with a small amount of methyl alcohol, and finally sucked to dryness. The product was placed in a vacuum desiccator of anhydrous $CaCl_2$ where it was dried for three days. The weight of the resultant crystalline product was 40.5 grams (92% of the theoretical yield). On heating, it charred and decomposed between 212 and 214° C.

In contrast to d-glucuronolactone isonicotinyl hydrazone, which could not be recrystallized from an aqueous medium, d-galacturonic acid isonicotinyl hydrazone was readily purified by recrystallization from boiling water in the presence of a small amount of decolorizing charcoal. From analytical data, however, it is apparent that the original product is almost as pure as the recrystallized. There is no appreciable difference in physical properties. The new compound is also freely soluble in dilute $NaHCO_3$, NaOH, and HCl. In sodium bicarbonate solution it may be used for injection in animals either intravenously or intraperitoneally.

EXAMPLE 4

D-galacturonic acid isonicotinyl hydrazone has also been prepared as follows, using water as the solvent.

D-galacturonic acid (100 g.) was dissolved in distilled (500 ml.). Isonicotinic acid hydrazide (65 g.) was also dissolved, separately, in the same solvent (250 ml.) by warming on a steam bath. The hot d-galacturonic acid solution was filtered and the clear solution added to the isonicotinic acid hydrazide solution. The mixture was thoroughly mixed by shaking and then heated on the steam bath for 10 minutes. White crystals started to separate even while the solution was still hot. The mixture was allowed to stand for twenty-four hours at room temperature. The crystals (white plates and rods) were filtered with suction, washed with a small amount of ice-cold distilled water, and then with some methanol. Suction was continued until the product became dry. The product was further dried in a vacuum desiccator over anhydrous calcium chloride for twenty-four hours. Weight: 124 g. The hydrazone melted at 207–208° (uncorr.); 211–212° (corr.) with charring and decomposition.

EXAMPLE 5

Another isonicotinyl hydrazone prepared from a uronic acid derived lactone is d-mannuronolactone isonicotinyl hydrazone,

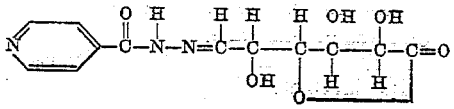

also a new compound with comparatively low toxicity and very high antitubercular activity. This compound has been prepared in the following manner:

On a steam bath, 17.5 grams of d-mannuronolactone was boiled with a mixture of 350 cc. of methanol and 150 cc. of distilled water until a clear solution resulted. To this solution 14 grams of isonicotinic acid hydrazide was added all at once, and the mixture boiled continually for ten minutes on a steam bath. The resulting clear solution was filtered, while hot, through a piece of lens paper into a 500 cc. Erlenmeyer flask and allowed to stand. After twenty-four hours, crystals in the form of fine white needles were observed and were filtered off with suction, washed with a small amount of ice-cold methyl alcohol, and sucked to dryness. The product was further dried in a vacuum desiccator for twenty-four hours. The total yield was 24.8 grams (85% of theoretical yield).

The pure crystals of d-mannuronolactone isonicotinyl hydrazone melted between 150 to 175° C. with foaming and decomposition. This compound may also be further purified by recrystallization from 75% methanol.

It is a notable feature of the three new isonicotinyl hydrazones, just described, that each may be produced from a uronic acid or lactone that is readily available and easily manufactured. In particular, d-galacturonic acid may be prepared from waste products such as orange or other citrus fruit peels. Of the lactones, d-mannuronolactone is prepared by hydrolysis of alginic acid from seaweed; while d-glucuronolactone may be produced from glucose, particularly by-product glucose from starch manufacture. It is significant that the latter is also a metabolite, e.g., a composition normally occurring in warm-blooded animals.

The new isonicotinyl hydrazones have been found to be highly active against tuberculosis in vivo and in vitro as well as clinically, while retaining a very low degree of toxicity. In tuberculosis infection of mice, in vivo tests indicated that 80 to 100 percent protection could be provided the animals by feeding them a diet containing only 0.02 to 0.05 percent of the new isonicotinyl hydrazones. On the other hand, in comparative toxicity tests of mice the LD 50 dose for the new hydrazones fell generally within the range of 1200 to 1800 mg./kg., while the LD 50 dose for the free hydrazide was 150 mg./kg. These results indicate that, generally speaking, equal weights of the new hydrazones are as active as the free hydrazide but only 1/10 as toxic. Additional indications based on the compounds tested, are that no appreciable difference exists in either the activity or toxic effects of the various isonicotinyl hydrazones derived from the uronic acids and their lactones.

In vitro activity is also marked. Tests of the new isonicotinyl hydrazones have indicated an ability to completely inhibit the growth of *mycobacterium tuberculosis* at concentrations of at least 0.2 microgram/cc. of culture or less, and, where the dilution was made, at concentrations of 0.02 microgram/cc. or less.

The antitubercular efficacy of d-glucuronolactone isonicotinyl hydrazone was also compared to that of isonicotinic acid hydrazide (both alone and in combination with streptomycin) in tests upon guinea pigs. These tests indicated again, that this new compound was at least as active as the free hydrazide, and revealed a capacity of the new drug to heal tuberculosis lesions by resolution at indicated dose levels. Corresponding doses of the uncombined isonicotinic acid hydrazide produced similar results. It is noted that these tests do not reflect toxic effects of the drugs since animals generally have a comparatively much higher drug tolerance than humans. Significant, however, is the indication that sufficiently large doses of the new drugs may result in complete destruction of the tubercle bacilli.

Acute and chronic toxicity tests were also performed on dogs to determine the effect of the new compounds on bodily functions. At no time during these tests was any damage to the organs or any significant functional change observed. When compared to the reported effects of isonicotinic acid hydrazide in similar tests, e.g. muscular tremblings or convulsions, salivation, mydriasis, loss of weight, etc., these tests further indicate that the new isonicotinyl hydrazones are comparatively much less toxic than the free hydrazide.

The antitubercular activity and relatively low toxicity of the new isonicotinyl hydrazones upon animals is shown in the following examples. In each of the experiments, except those performed on dogs, a single strain of animal bred under uniform conditions of nutrition and environment were used.

EXAMPLE 6

A group of 30 mice averaging 18 to 20 grams in weight, were each infected intravenously with 0.4 cc. of a human strain of *mycobacterium tuberculosis* (H37RV) at a concentration of 2.5 mg./cc. in Youman's medium having 20% soluble starch added. Commencing 24 hours after injection of the organisms, ten of the animals were placed on a plain unmedicated commercially available mouse diet, as controls. For comparison, ten animals were also injected subcutaneously with 3000 units, weekly, of streptomycin sulfate, and fed from the unmedicated diet.

Five animals were allowed to feed ad libitum from the same mouse diet containing 0.05 percent of powdered d-glucuronolactone isonicotinyl hydrazone. Based on the observation that mice normally consume 5.0 grams of food per day, this diet corresponds to a drug consumption of 2.5 mg. per mouse per day.

Five animals were also placed on the same mouse diet containing 0.02 percent of powered d-glucuronolactone isonicotinyl hydrazone, corresponding to 1.0 mg. per mouse per day.

The test period was 20 days. The results of these tests are tabulated in Table I:

*Table I*

| Compound | Percent in Diet | No. of Mice | Percent Mortality | Mean Survival Time in Days |
|---|---|---|---|---|
| d-glucuronolactone isonicotinyl hydrazone | 0.05 | 5 | 0 | 20+ |
|  | 0.02 | 5 | 20 | 18.2 |
| Streptomycin | 3,000 units weekly | 10 | 0 | 20+ |
| Control |  | 10 | 100 | 14 |

On the 20th day all the animals were sacrificed and autopsied. None of the surviving animals which where fed on diets containing d-glucuronolactone isonicotinyl hydrazone or streptomycin showed any gross tuberculous lesions in the lungs. All the control animals, however, showed generalized tuberculosis, evidenced in each case by wide spread tuberculous lesions.

These results were confirmed in other more accurate experiments in which the above indicated daily doses of d-glucuronolactone isonicotinyl hydrazone were administered by intravenous injection into the dorsal vein in the tail of each of the mice receiving the new drug.

EXAMPLE 7

A group of 30 mice were infected intravenously in the same manner as described in Example 6. Again, ten animals were placed on unmedicated mouse diet as controls, and ten animals injected subcutaneously, once a week, with 3000 units of streptomycin sulfate. The remaining 10 animals were fed ad libitum mouse diet containing 0.023 percent of d-galacturonic acid isonicotinyl hydrazone, corresponding to a drug consumption of 1.15 mg. per mouse per day.

This test was conducted for a period of 28 days, the results of which are tabulated in Table II.

*Table II*

| Compound | Percent in Diet | No. of Mice | Percent Mortality | Mean Survival Time in Days |
|---|---|---|---|---|
| d-galacturonic acid isonicotinyl hydrazone | 0.023 | 10 | 0 | 28+ |
| Streptomycin | 3,000 units weekly | 10 | 20 | 27.66+ |
| Control |  | 10 | 90 | 18.3+ |

All the animals were sacrificed on the 28th day and autopsied. Again, none of the animals fed on diets containing d-galacturonic acid isonicotinyl hydrazone nor any of the surviving streptomycin animals showed any gross tuberculous lesions in the lungs; while, all the control animals showed widespread tuberculous lesions in the lungs.

EXAMPLE 8

Seventy-two male guinea pigs (each weighing 600 grams) were inoculated substernally with 0.0001 gram of a virulent strain of tubercle bacilli (V-80). They were divided into 6 numbered groups of 12 animals each with twelve guinea pigs in group 1 being used as controls. The others were left untreated for 21 days. One animal in group 4 died during the twenty-one day period from pulmonary embolism; and one control animal was sacrificed for observation at the end of the period and was found to have generalized tuberculosis. The remaining animals in the 6 groups received daily for seven days, respectively:

(1) No medication
(2) 1 mg. of isonicotinic acid hydrazide intramuscularly
(3) 10 mg. of isonicotinic acid hydrazide intramuscularly
(4) 10 mg. of isonicotinic acid hydrazide plus 6 mg. of streptomycin intramuscularly
(5) 10 mg. of d-glucuronolactone isonicotinyl hydrazone by intubation
(6) 25 mg. of d-glucuronolactone isonicotinyl hydrazone by intubation By 39 days (60 days after beginning the experiment) four of the control animals had died, and had lost an average of 50 grams in weight. The surviving guinea pigs were sacrificed. The average weight gain for the 7 surviving control animals was 9 grams.

For all animals receiving isonicotinic acid hydrazide the average increase in weight was 220 grams. For all types of d-glucuronolactone isonicotinyl hydrazone-treated animals the average increase was 300 grams.

Necropsy revealed generalized tuberculosis in all the control animals. In the 1 mg. isonicotinic acid hydrazide guinea pigs evidence of active tuberculous infection was noted in the lungs of two animals. The streptomycin plus isonicotinic acid hydrazide animals showed no evidence of tuberculosis, but one small tubercle, which appeared to have healed was noted in the lung of one animal. Similar results were achieved with the 10 mg. isonicotinic acid hydrazide group.

In all the animals receiving the new hydrazone there was no gross or microscopic evidence of any tuberculous infection, except for one small tubercle in the 25 mg. treated group, and the animals appeared, generally, to have been cured by resolution.

These results were confirmed in a similar test on other guinea pigs inoculated instead with *M. tuberculosis*

H37RV. In these tests, a 5 mg. dose per day of d-glucuronolactone isonicotinyl hydrazone was also administered with results equal to those of the 10 mg. or 25 mg. series described above.

EXAMPLE 9

In a comparative test, 5 percent solutions of each of the following compounds were prepared by dissolving in sterile distilled water:

(1) D-glucuronolactone isonicotinyl hydrazone
(2) D-galacturonic acid isonicotinyl hydrazone
(3) D-mannuronolactone isonicotinyl hydrazone, and
(4) Isonicotinic acid hydrazide Mice, weighing 20 to 25 grams in weight, were divided into groups of 20, and several groups were injected intraperitoneally with varying doses of one of the solutions. This procedure was repeated until varying doses of each of the compounds had been administered to a number of groups, with 20 mice being used at a single dose. The mortalities at each dose were observed after four to five hours, and the results were plotted graphically for each dose of each compound.

The interpolated dose necessary to kill half of the animals in a group (LD 50) was then determined from the plot of each compound. The results are tabulated in Table III.

Table III

| Compound | LD 50 mg./kg. |
| --- | --- |
| Isonicotinic acid hydrazide | 150 |
| d-glucuronolactone isonicotinyl hydrazone | 1,200 |
| d-galacturonic acid isonicotinyl hydrazone | 1,800 |
| d-mannuronolactone isonicotinyl hydrazone | 1,500 |

These results indicate that, generally speaking, the new compounds are only 1/10 as toxic as the free hydrazide.

The acute and chronic toxicity of the new compounds in tests on dogs is illustrated in the following examples:

EXAMPLE 10

To determine acute toxicity, nine dogs weighing 16 to 25 pounds were anesthetized by the intravenous injection of sodium pentabarbital. The carotid artery was cannulated and connected to a mercury manometer arranged to record the blood pressure on a kymograph. A pneumograph was placed around the chest and connected to a tambour to record respiratory movement on the kymograph. A rubber balloon was inserted through an incision into the small intestine and then connected to a tambour to record intestinal movements on the kymograph. After a recording of normal values, the drug to be tested was injected into the femoral vein and a continuous recording of respiration, blood pressure, pulse rate and intestinal motility was made over a period of an hour.

The following drugs were tested by the above procedure, giving in each case, a dose of 100 mg./kg. of:

(a) D-glucuronolactone isonicotinyl hydrazone (3 dogs)
(b) D-galacturonic acid isonicotinyl hydrazone (3 dogs)
(c) D-mannuronolactone isonicotinyl hydrazone (3 dogs)

The results in every case were the same in that at no time during or following the injection of the compounds was there a significant change in respiration, pulse rate, blood pressure or intestinal motility.

EXAMPLE 11

To determine chronic toxicity in dogs, four healthy dogs were selected, weighing 16 to 25 pounds, and placed on a diet of "Skippy" dog food for a week. Two of these dogs were then given daily doses of 50 mg./kg. of the d-glucuronolactone isonicotinyl hydrazone and two were given 50 mg./kg. of d-galacturonic acid isonicotinyl hydrazone mixed with their food. The animals were observed for a period of two weeks and tests were carried out at intervals both before and after the diets were started to see if any significant toxic effects were produced. At the end of the two week period, the dogs were sacrificed using sodium pentabarbital and autopsied by a pathologist. The following is a list of tests performed on the dogs:

(a) BLOOD EXAMINATION

Red cell count, hemoglobin, reticulocyte count, sedimentation time, white cell count, differential count in white cells, non-protein nitrogen, blood sugar, prothrombin.

(b) URINE EXAMINATION

Albumen, casts, sugar, bile, bacteria, white cells, red cells, crystals, epithelial cells.

When compared to the findings of these tests before starting the drugs, there was no significant change in any of them with the exception of the red count, hemoglobin and prothrombin which showed a definite improvement. There was nothing found at autopsy in any of the organs to indicate any damage or functional change. These results indicate that in the doses given, no toxic effect can be demonstrated on liver function, kidney function, or blood formation.

The activities of the new isonicotinyl hydrazones in vitro are shown in the following examples.

EXAMPLE 12

Dilutions of d-glucuronolactone isonicotinyl hydrazone in Youman's medium were prepared having final concentrations of 0.2, 0.02, 0.002, and 0.0002 mg./cc., and 10 cc. of each were placed into separate test tubes. A fifth test tube of Youman's medium was prepared as a control. Each test tube was inoculated with 0.2 cc. of a 7 day old culture of Mycobacterium tuberculosis (H37RV) in Youman's solution, modified by the addition of 0.01% Tween 80. This inoculation corresponds to approximately 0.2 mg. of cell material per tube. A ten day period of incubation at 37° C. was allowed, and then cell suspensions were prepared by autoclaving the tubes at 121° C. under 15 pounds pressure for 45 minutes. The tubes were then adjusted to a volume of 10 cc. and read in a Coleman Spectrophotometer at 660 Mu. The results of these readings are tabulated in Table IV.

Table IV

| Concentration, mgs./cc. | Percent Transmission of light |
| --- | --- |
| 0.2 | 100 |
| 0.02 | 100 |
| 0.002 | 100 |
| 0.0002 | 100 |
| Control | 87.5 |

It will be observed from these results that d-glucuronolactone isonicotinyl hydrazone achieved a complete inhibition of the growth of Mycobacterium tuberculosis down to a concentration of 0.2 microgram/cc. Dilutions below this concentration were not made or tested indicating further investigation may be desirable, particularly in view of the results obtained with d-mannuronolactone isonicotinyl hydrazone (Example 14).

EXAMPLE 13

Experiments were carried out in the same way as in Example 2 using identical dilutions of d-galacturonic acid isonicotinyl hydrazone in Youman's solution, the results of which are tabulated in Table V.

Table V

| Concentration, mgs./cc. | Percent Transmission of Light |
|---|---|
| 0.2 | 95 |
| 0.02 | 94.5 |
| 0.002 | 96 |
| 0.0002 | 96.5 |
| Control | 81.5 |

These results indicate that d-galacturonic acid isonicotinyl hydrazone may also accomplish almost complete inhibition of the growth of *Mycobacterium tuberculosis* at concentrations at least as small as 0.0002 mg./cc.

EXAMPLE 14

D-mannuronolactone isonicotinyl hydrazone was tested for antitubercular activity in vitro, using the method described by Rake et al. (Am. Rev. Tub., vol. 60, No. 1, July 1949). The BCG strain of the bovine type tubercle bacillus was grown in Kirchner Synthetic Medium for the seed culture. The assay medium was of a modified Kirchner formula containing 2 cc. of seed culture per 100 cc. of assay medium. The compound was used at two-fold dilutions in test tubes inoculated with the bacilli so that the first tube contained 0.6 mg./cc., while the final dilution contained 0.0025 microgram/cc. Tests were incubated at 37° C. for 112 hours. Results were based on turbidity (growth) at the end of the incubation period. At the end of the test period the tests were compared with two sets of controls, one inoculated with the bacilli and the other containing only the Kirchner medium. The inoculated control was very turbid while the control medium was water clear. By this test it was determined that d-mannuronolactone isonicotinyl hydrazone had a minimal inhibiting concentration at 0.02 microgram/cc. (dilution of 1:50,000,000), at which concentration no evidence of growth was observed.

The following example demonstrates the antitubercular activity of d-glucuronolactone isonicotinyl hydrazone against 18 strains of *Mycobacterium tuberculosis* which had shown previous resistance to the action of the free hydrazide.

EXAMPLE 15

Eighteen plates were prepared each containing 12 cc. of a solution having a concentration of 10 micrograms of d-glucuronolactone isonicotinyl hydrazone per cc. These plates were then inoculated each with 0.5 cc. of the serums of patients known to be infected with *Mycobacterium tuberculosis* which, based on previous identical tests conducted on the same serums, were known to be more than 50% resistant to the action of equivalent amounts of isonicotinic acid hydrazide. After an incubation period of more than four weeks only two of the plates showed any signs of growth; whereas, 16 of the plates proved negative on testing and were incapable of producing subsequent bacteria growth.

Additional investigations have been carried out which confirm and establish the results shown in the previous examples, and, with particular reference to d-glucuronolactone isonicotinyl hydrazone, have indicated that equal amounts of the new drugs are as active as any concentrations of isonicotinic acid hydrazide ever used against *Mycobacterium tuberculosis*. This is so even though the comparative weights of molecular isonicotinic acid hydrazide in the respective drugs are entirely disproportionate. Thus the theoretical amount of molecular isonicotinic acid hydrazide in d-glucuronolactone isonicotinyl hydrazone is only 47% that of an equal weight of the free hydrazide. Similar comparisons can be made as to d-galacturonic acid isonicotinyl hydrazone and d-mannuronolactone isonicotinyl hydrazone. These facts alone would indicate safe dosage levels of the new drugs at least twice that of the uncombined hydrazide, whereas, in actual studies, doses up to 10 times the tolerated amount of isonicotinic acid hydrazide have been administered without harmful effects. These unexpected results confirm the belief that the new drugs act as chemical moieties, rather than by hydrolysis decomposition in the blood stream, which, thereby, achieve greatly reduced toxicity because of the new chemical combination.

Following the favorable conclusion of tests in vitro and on animals, several clinical studies were undertaken to evaluate the obvious advantages inherent in the reduced toxicity of the new drugs.

One clinical study of eleven patients is reported in the following example. It is significant that a majority of these cases were cases of long duration, including several advanced types which are generally classified as hopeless. The example is concerned with the first group of patients who completed three or more months of treatment, and indicates recovery in seven of the cases and marked improvement in two others. These results are all the more remarkable since they were achieved in the relatively short time of a few months.

EXAMPLE 16

Eleven tuberculosis patients who had never been treated with isonicotinic acid hydrazide and whose sputum was constantly positive to direct or concentrated smears were selected on a voluntary basis for clinical trial. All patients were either moderately or far advanced cases of which four were fibro-caseous types of long duration, three were old cases having large cavities, one involved a bronchogenic fistula, and three were fresh exudative type cases. Known duration of disease varied from six months to in excess of twenty years. An initial dose of 600 mg. per day of d-glucuronolactone isonicotinyl hydrazone was administered orally in tablet form. Every few days this was increased approximately 50 percent, until a maximum daily dosage of 2,400 mg. was reached. No untoward effects were observed at this high dosage level, although treatment was discontinued in one patient due to polyneuritis while the daily dosage was reduced from 2,400 mg. to 1,800 mg. in another. The treatment was continued in the remaining patients for three or more months before the present data was accumulated, indicating that a daily dose of 2,400 mg. is probably not excessive in the average case. Pneumoperitoneum was given simultaneously in two cases, and was begun after 6 to 8 weeks in three others.

All ten of the patients continuing treatment claimed to feel better, and those patients who were underweight invariably showed satisfactory weight gains. The cough was generally calmed within a few weeks, and the expectoration of sputum either ceased or was considerably reduced in volume. More remarkable was the rapidity with which the sputum was rendered negative. Sputum conversion occurred in 9 of the 10 treated patients within 5 months after starting the full dose of 2,400 mg. Sputum conversion occurred in 6 of these patients, including the patient on whom treatment was stopped, within one month after the start of full dosage. X-ray improvement occurred in 7 of the ten patients after only 3 months, and was moderate to marked in 6 of these cases. In the cases not showing X-ray improvement the known duration of disease was several years and their X-rays had been stable for variable periods never less than 6 or 8 months.

The overall results indicated that 9 of the 10 treated patients were well on the way to recovery after only three months while the patient failing to show sputum conversion nevertheless showed mild X-ray improvement. Seven of the patients may be said to have recovered. It appears justified to state, also, that the drug was relatively well tolerated at the high dosage level used, although clinically effective dosage levels have subsequently been indicated in a range of 1200 to 1800 mg. per day, at which levels no complications developed.

Since drug action as a rule is correlated with the concentration of the drug in the blood stream, it appears that high concentrations of anti-tubercular drug in the blood stream are desired for the treatment of certain types of tuberculosis, especially military and meningeal. Reported blood levels for isonicotinic acid hydrazide are approximately 1.5 to 2.4 micrograms per cc. at the peak level which occurs about two hours after administration of a near maximum dose of 300 mg. On the other hand, clinical studies of d-glucuronolactone isonicotinyl hydrazone have shown blood levels in the range of at least 12.5 to 24 micrograms per cc. for a similar dose, or approximately 10 times that of the free hydrazide. Since low toxicities of the new hydrazones permit many times this comparative dose, even higher blood levels are indicated at increased doses of the new drugs than are possible with isonicotinic acid hydrazide.

The following example demonstrates blood level concentrations for the d-glucuronolactone compound.

EXAMPLE 17

Blood levels were run on 16 patients, including the 11 specified in Example 18, with a total of 18 determinations being made. The blood levels were determined essentially as in the procedure proposed by Rubin et al. (Dis. Chest, volume 21, page 439, 1952). The blood levels found ranged between 12.5 and 24 micrograms per cc. of plasma two hours after ingestion of a single dose of 330 mg. of d-glucuronolactone isonicotinyl hydrazone.

Of importance therapeutically is the ease with which the new drugs may be administered. Because of their crystalline form, the new isonicotinyl hydrazones may be easily compressed into tablets for oral use; or they may take other dosage forms suitable for oral ingestion, such as capsules or powders. Likewise, the solubility of the isonicotinyl hydrazones in harmless solvents such as distilled or sterile water, as well as their ease of assimilation into the blood stream, readily adapt them for parenteral use whether injected intravenously, subcutaneously, or intraperitoneally.

The low toxicity of the new hydrazones also simplifies the preparation of suitable dosage forms, and in most cases it is preferable to have the active material constitute the major portion of the dose. The following formulations, as well as the animal diets described in examples above, are purely illustrative of the many conceivable ways in which the new drugs may be administered, and are not intended to be in any sense limiting. For the sake of brevity the examples relate only to the d-glucuronolactone form of the new isonicotinyl hydrazones, but it will be apparent to one skilled in the art that similar formulations, such as the non-toxic salts thereof, would be suitable for any of the uronic acid derived isonicotinyl hydrazones.

Some examples of d-glucuronolactone tablet compositions suitable for oral administration are illustrated in Examples 18, 19, and 20.

EXAMPLE 18

| | Mg. |
|---|---|
| D-glucuronolactone isonicotinyl hydrazone | 200 |
| Lactose-starch granules | 100 |
| Magnesium stearate | 10 |

The ingredients were slugged, then granulated and re-tableted.

EXAMPLE 19

| | Mg. |
|---|---|
| D-glucuronolactone isonicotinyl hydrazone | 200 |
| Lactose | 100 |
| Corn starch | 30 |
| Corn starch paste (10%) | Sufficient quantity |
| Talc-stearic acid | 20 |

Conventional granulation methods were used.

EXAMPLE 20

| | Mg. |
|---|---|
| D-glucuronolactone isonicotinyl hydrazone | 200 |
| Corn starch | 30 |
| Glucose 50% | Sufficient quantity |
| Calcium stearate | 10 |

Some examples of elixirs suitable for oral ingestion are as follows:

EXAMPLE 21

| | | |
|---|---|---|
| D-glucuronolactone isonicotinyl hydrazone | g | 4 |
| Propylene glycol | g | 46 |
| Syrup U.S.P. | cc | 100 |

EXAMPLE 22

| | | |
|---|---|---|
| D-glucuronolactone isonicotinyl hydrazone | g | 4 |
| Propylene glycol | g | 26 |
| Syrup U.S.P. | g | 30 |
| Distilled water | cc | 100 |
| Flavor and color | Sufficient quantity | |

One tablespoon of the elixir is computed to be the equivalent of a 600 to 650 milligram dose of d-glucuronolactone in each of Examples 21 and 22.

A suitable method for preparing a large lot of an injectable form of d-glucuronolactone isonicotinyl hydrazone is as follows:

EXAMPLE 23

Eight liters of distilled water for injection, U.S.P., are placed in a 20-liter Pyrex glass bottle. To this water 500 grams of d-glucuronolactone isonicotinyl hydrazone are added with stirring until solution is effected. The pH is adjusted thereafter with sufficient reagent grade N/10 hydrochloric acid to achieve a pH of about 5.0. Then sufficient water for injection is added to bring the volume to 10 liters. The solution is filtered and filled into clean, dry, sterile, flint glass ampuls, each containing 2.2 cc. of the fluid. The ampuls are sealed and sterilized for 30 minutes at 115° F.

Such composition may crystallize under certain circumstances, but the crystals will be readily dissolved when the contents of the vial are heated to body temperature (37° C.).

It will be apparent to those skilled in the art to which this invention relates that widely differing procedures, embodiments and applications of the invention, as well as some variation in the spatial relationships of the chemical structures, will suggest themselves without departing from the spirit and scope of the invention. The non-toxic salts are one such embodiment. The disclosures and examples herein are purely illustrative and are not intended to be in any sense limiting. For example, optical isomers, such as the l-uronic acids and their lactones, as well as the racemates of such isomers, may subsequently prove to be as useful, or even more useful, than the d-uronic-compounds. Nor is there any intention to limit the use of the new compound solely to combating human strains of the tubercle bacillus, since the new drugs are thought to be effective against all forms of human tuberculosis whether caused by the human strain or the bovine (cattle) strain of the bacillus. Also, there is reason to believe that the new compounds may be effective as therapeutic agents in the treatment of other acid fast organisms, such as *mycobacterium leprae*, and against micro-organisms responsible for some psychoses and certain dermatological manifestations, to indicate only a few additional uses.

The essential feature of this invention, however, is the production of new isonicotinyl hydrazones and their salts from uronic acids and their lactones which have substantial antitubercular activity, yet which are comparatively much less toxic than the free hydrazide drug, isonicotinic acid hydrazide. Stated cautiously, this activity, on an equal weight basis, is approximately equal to that of the free hydrazide, while the toxicity is not more than 1/10 that of the free hydrazide. This feature permits a considerably larger dosage of the new isonicotinyl hydrazones than has ever been possible with the free hydrazide since at least ten times the antitubercular activity in diseased patients may be achieved without any further increase in harmful side effects. In fact, the prospect of such toxic side effect is greatly reduced, since conversely, doses having equal activity would have but 1/10 the toxicity. Actual dosage will, of course, fall somewhere in between.

What is claimed is:

1. A new compound selected from the group consisting of d-glucuronolactone isonicotinyl hydrazone, d-galacturonic acid isonicotinyl hydrazone, d-mannuronolactone isonicotinyl hydrazone, and the non-toxic salts thereof.

2. The new compound, d-galacturonic acid isonicotinyl hydrazone of the formula:

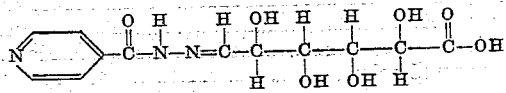

3. The new compound, d-mannuronolactone isonicotinyl hydrazone of the formula:

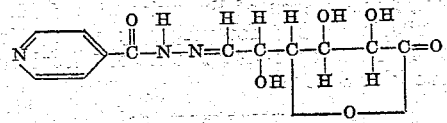

4. The method of treating tuberculosis infection without causing toxic side effects in the infected organism which comprises administering to said organism a minimum dose of approximately 600 mg. per day of a compound selected from the group consisting of d-glucuronolactone isonicotinyl hydrazone, d-galacturonic acid isonicotinyl hydrazone, d-mannuronolactone isonicotinyl hydrazone, and the non-toxic salts thereof.

5. The new compound, glucuronolactone isonicotinyl hydrazone of the formula:

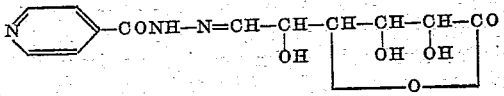

6. The method of treating tuberculosis in the human body without causing harmful side effects comprising administering to the patient a minimum dose of approximately 600 mg. per day of a compound selected from the group consisting of d-glucuronolactone isonicotinyl hydrazone, d-galacturonic acid isonicotinyl hydrazone, d-mannuronolactone isonicotinyl hydrazone, and the non-toxic salts thereof.

References Cited in the file of this patent

UNITED STATES PATENTS 2,685,580    Fox _____ Aug. 3, 1954
2,712,021    Tenenbaum _____ June 28, 1955

OTHER REFERENCES

Yale et al.: J. Am. Chem. Soc., vol. 75, pp. 1933–1942 (1953).

Selikoff: Quarterly Bull. Sea View Hosp., vol. 13, No. 1, pp. 17–19.

UNITED STATES PATENT OFFICE

CERTIFICATE OF CORRECTION

Patent No. 2,940,899                                                            June 14, 1960

Peter P. T. Sah

It is hereby certified that error appears in the printed specification of the above numbered patent requiring correction and that the said Letters Patent should read as corrected below.

Column 2, line 49, for "hydrazines" read -- hydrazones --; column 5, line 49, before "(500 ml.)" insert -- water --; column 13, line 5, for "military" read -- miliary --.

Signed and sealed this 6th day of December 1960.

(SEAL)
Attest:

KARL H. AXLINE
Attesting Officer

ROBERT C. WATSON
Commissioner of Patents